United States Patent [19]

Stecher et al.

[11] Patent Number: 5,403,532
[45] Date of Patent: Apr. 4, 1995

[54] PRODUCTION PROCESS FOR A GASKET AND TOOL FOR PERFORMING THE PROCESS

[76] Inventors: Friedhelm Stecher, Lohrstrasse 72, D-5090 Leverkusen-Hitdorf; K. Gerd Friedrichs, Leising 15, D-8432 Beilngries, both of Germany

[21] Appl. No.: 50,427

[22] PCT Filed: Nov. 14, 1991

[86] PCT No.: PCT/EP91/02150
  § 371 Date: Aug. 23, 1993
  § 102(e) Date: Aug. 23, 1993

[87] PCT Pub. No.: WO92/08559
  PCT Pub. Date: May 29, 1992

[30] Foreign Application Priority Data

Nov. 14, 1990 [DE] Germany .......... 40 36 255.8
Nov. 15, 1990 [DE] Germany .......... 40 36 439.9
Apr. 11, 1991 [DE] Germany .......... 41 11 791.3
Jul. 15, 1991 [EP] European Pat. Off. ..... 91111793

[51] Int. Cl.⁶ .................. B29C 59/04; B29C 33/38
[52] U.S. Cl. .................. 264/219; 264/153; 264/220; 264/284; 425/299; 425/363; 425/385
[58] Field of Search .......... 264/219, 220, 145, 153, 264/154, 156, 284, 293; 425/289, 291, 294, 385, 299, 363

[56] References Cited

U.S. PATENT DOCUMENTS

| 1,797,568 | 3/1931 | Dean | 264/153 |
| 1,921,455 | 8/1933 | De Laney | 425/385 |
| 2,527,398 | 10/1950 | Chavannes | 264/153 |
| 3,051,608 | 8/1962 | Gordon | 425/385 |
| 3,121,913 | 2/1964 | Hagmann et al. | 425/353 |
| 3,508,458 | 4/1970 | Cunningham | 264/153 |
| 3,526,163 | 9/1970 | Lowery | 425/290 |
| 4,867,922 | 9/1989 | Zuccato | 264/219 |
| 5,024,719 | 6/1991 | Heck et al. | 425/385 |

FOREIGN PATENT DOCUMENTS

| 0079263 | 5/1983 | European Pat. Off. |
| 505468 | 8/1930 | Germany |
| 59-217060 | 4/1985 | Japan |

Primary Examiner—Jay H. Woo
Assistant Examiner—Duane S. Smith
Attorney, Agent, or Firm—Sixbey, Friedman, Leedom & Ferguson

[57] ABSTRACT

A process for the production of a gasket is described, in which at least on one side and at least on all bearing points in the use case a three-dimensional sealing surface complimentary to the deflection of the surfaces to be sealed is permanently shaped prior to assembly, as well as a tool for performing the process. An assembly pattern is produced in such a way that a plastically deformable material is fixed between the surfaces to be sealed. A negative copy or form of the assembly pattern is produced on the circumferential surface and the gasket is produced accompanied by the rolling of the stamping roller.

9 Claims, 3 Drawing Sheets

PRODUCTION PROCESS FOR A GASKET AND TOOL FOR PERFORMING THE PROCESS

BACKGROUND OF THE INVENTION

1. Field of the Invention

The invention relates to a process for the production of a gasket, in which at least on one side on at least all points bearing in the use case, prior to installation, a three-dimensional sealing surface complimentary to the deflection of the surfaces to be sealed is shaped, as well as to a tool for performing the process.

2. Description of Related Art

As is known, gaskets and in particular cylinder head gaskets, require at the sealing point a specific contact pressure to enable them to fulfill their function. In the case of larger sealing surfaces, such as, e.g., between a cylinder head and a cylinder block of internal combustion engines, this contact pressure is produced with the aid of screws, the forces of which have to be distributed in a planned manner over the surface.

Known gaskets comprise a material whose thickness can be deformed on installation, or are made from thickness-deformable elements. It is disadvantageous that, on installation or in certain operating states, said gaskets are irreversibly deformed, so that, subsequently, the sealing effect is limited.

However, unlike in the case of the aforementioned gaskets, other gaskets, details of which have not yet been published, are provided at the time of manufacture and on a permanent basis with a thickness distribution that is correct for the particular application. They have, prior to installation or assembly, a topography required for the necessary pressure distribution. Therefore, the screw forces are distributed in a planned manner over the bearing surfaces to be sealed.

SUMMARY OF THE INVENTION

The object of the invention is to provide a production process for gaskets of the initially mentioned type, as well as a tool for this purpose. This object is achieved in the manners indicated herein.

A preferred further development comprises the following process steps:
a) producing an assembly pattern in such a way that a plastically deformable material is fixed between the surfaces to be sealed,
b) copying the topography of the assembly pattern in that it is scanned with a thickness gauge and the measured data are stored in a data processor,
c) producing a topography in the data processor on the basis of the measured values and which is optionally corrected or modified taking account of operating and material parameters of the sealing surfaces,
d) producing a negative form or mold of the topography by means of a material process on the outer surface of a stamping roller under the control of the data processor and
e) stamping the topography accompanied by stamping roller rolling.

The invention offers the advantage that a linear pressure is exerted on the material to be stamped or impressed, so that relatively small working forces occur. As a result of the movement of the roller over the sealing material there is no reshaping of the already profiled surface through the instantaneously deformed material.

According to a preferred development of the invention the roller circumference corresponds to the gasket length and has the complete gasket topography.

Alternatively, it can be advantageous for a given topography to be distributed several times in succession on the circumference and that one gasket side is completely formed by a single roller revolution. By simply rolling the roller, the corresponding topography is repeated stagewise, which can simplify production in the case of gaskets for engines having several cylinders.

A gasket free from undesired reshaping and material flows is obtained in that the stamping roller faces a counterroller, accompanied by the formation of a drawing channel.

In order to produce a gasket provided with a topography on two sides, it is particularly advantageous for there to be two correspondingly profiled rollers in axially parallel, juxtaposed form and accompanied by the formation of a drawing channel. It can be appropriate to weaken, in locally planned manner by a mechanical or thermal pretreatment, the areas provided for deformation purposes.

According to another development of the invention the stamping is performed in a state of slight deformability of the sealing material, which is then hardened.

Very precise sealing surfaces are obtained by performing the stamping process in two steps. Firstly a pre-impression is produced, followed by the stamping of the final topography.

A preferred development of the production process comprises that topography changes are made during copying, taking engine-specific and/or different operating states into consideration at the same time.

In this way, the topography can, if necessary, be corrected, or predetermined areas can be loaded or load-relieved in planned manner. For example, during the production of an assembly pattern, the webs between two combustion chamber passage openings are loaded less than the comparable outer edges. Therefore, in said outer areas, the assembly pattern has a reduced thickness. However, this leads to an undesired distortion of the cylinder head. If these undesired deformations are corrected at the time of copying, it has the advantage that the cylinder head is not distorted to the same extent.

It is also appropriate that the assembly pattern, produced under different operating states of the surfaces to be sealed, is evaluated and the test data determined are calculated for producing a topography, so as to bring about an optimum adaptation, which takes into account the different operating states.

The stability is optimized in that the gasket is subject during production to deforming forces, which are higher than the contact pressures occurring in operation.

In addition to or as an alternative to the aforementioned process steps, it can be advantageous for the starting material to be e.g. thermally or chemically brought into an easily deformable state and for the material to be hardened after shaping.

Another preferred development of the production process comprises using a plate-like starting material and initially obtaining a locally different envelope thickness distribution that is inverted as compared with the subsequent thickness distribution by impressing and simultaneously growing out of a predetermined topography, and that finally, the final shape is pressed in without any lateral flow of the material.

It is also appropriate that the bearing surface areas intended for sealing purposes are raised by immediately adjacent impressed depressions from an originally uniformly thick starting plate.

The gasket can be produced with very few operating steps in that the prominent bearing surface areas are given the final thickness distribution at the time of impressing the adjacent depressions by a material displacement.

It is advantageous that a projection is produced by an impression on neighboring sides.

It can also be advantageous to make the impressions in areas, which in a following process step are stamped out for producing openings.

BRIEF DESCRIPTION OF THE DRAWINGS

The invention is described in greater detail hereunder relative to two embodiments and the attached drawings, wherein show.

DETAILED DESCRIPTION OF THE PREFERRED EMBODIMENTS

Figure 1:
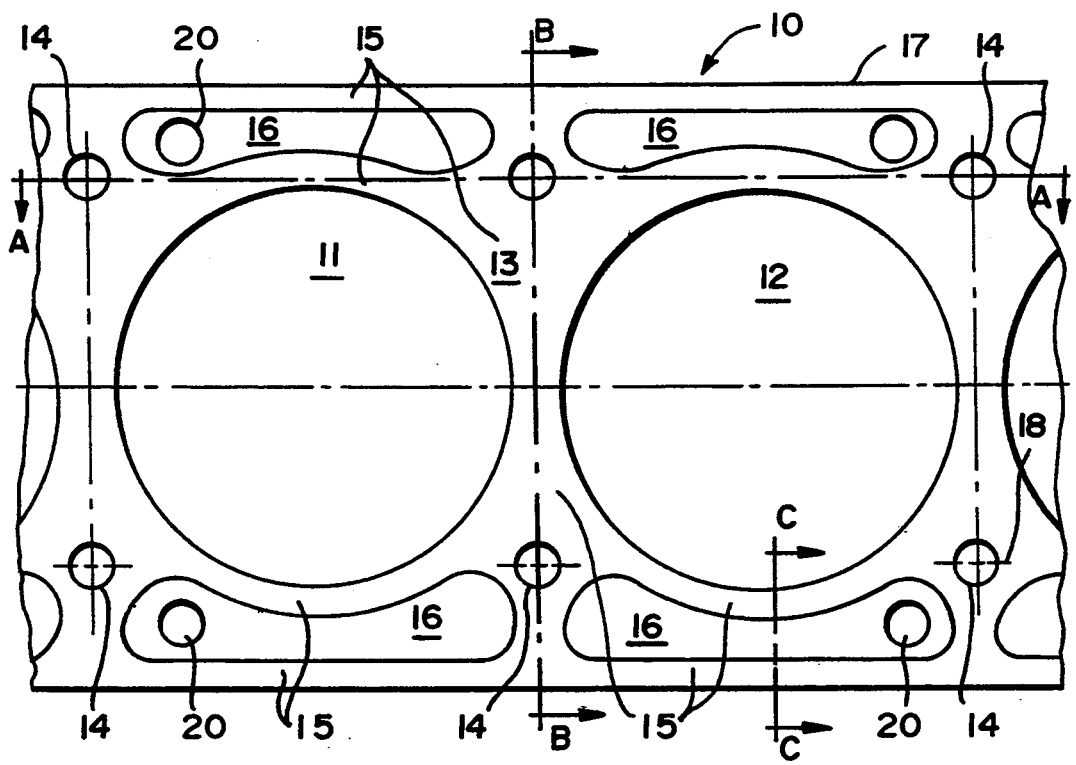
FIG. 1 is a partial plan view of a gasket.

The cylinder head gasket 10 shown in FIG. 1 comprises a gasket plate 11 made from a material which, in the assembled state and under operating conditions, is pressure-resistant and is not thickness-deformable, e.g. aluminum or heat-resistant plastic. On its top and bottom, gasket plate 11 has topographical surfaces projecting from the drawing plane and which will be described in greater detail hereinafter. The represented portion of the gasket plate 11 has two juxtaposed combustion chamber passage openings 11, 12, between which there is a web 13. There are also openings 14, which in the installed state between a cylinder head and a cylinder block of an internal combustion engine (not shown) receive screws for pressing the sealing surfaces.

The cylinder head gasket 10 has bearing, and therefore sealing, areas 15, as well as non-bearing areas 16 distributed in island-like manner therein. The distribution of the bearing and non-bearing areas 15, 16 is determined by the distribution of the combustion chamber passage openings 11, 12, the non-bearing areas 16 with openings 20 and the screw openings 14. Bearing areas 15 are, in each case, arranged in uninterrupted manner around the combustion chamber passage openings 11, 12 and also along the plate edges. The non-bearing areas 16 are located between the marginally bearing areas 15 and an imaginary line 18 which runs parallel to the plate edges 17 through the centers of the screw openings 14 associated with each plate edge. In the non-bearing areas 16 the openings 20 for the water and oil drain lines or the like are stamped out.

Figure 2:
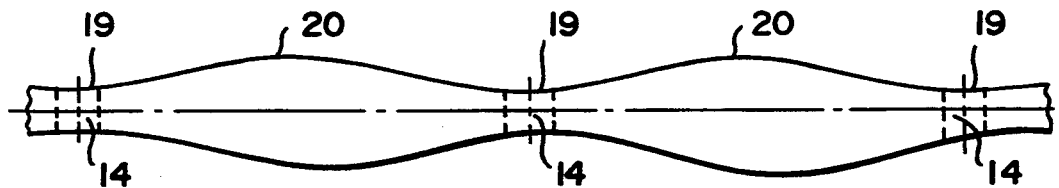
FIG. 2 is a vertical cross-section through the gasket according to FIG. 1 taken along the section line A—A.

The vertical cross-section along the section line A—A according to FIG. 2 shows the topography of the cylinder head gasket 10 parallel to the plate edges 17 in one of the lines 18 in a bearing area 15. The thickness distribution is permanently predetermined prior to assembly in that the surface pattern is shaped in accordance with the pressure distribution needed in the assembled state. Therefore, the minimum thickness is in the vicinity of the screw openings 14. From this low point 19 the thickness continuously rises to a maximum 20 in the center between two screw openings 14. This curve substantially corresponds to the bending line of a cylinder head in the screwed-down state. The invariable, predetermined assembly thickness is therefore shaped precisely to the cavity formed during the screwing together of the cylinder head and cylinder block. In the present embodiment the topographies of the top and bottom are different.

Figure 3:
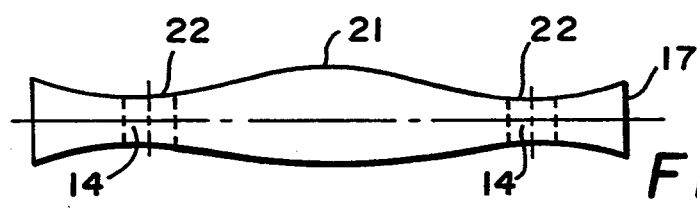
FIG. 3 is a vertical cross-section through the gasket according to FIG. 1 taken along a section line B—B.

The vertical section along the section line B—B in FIG. 3, which runs transversely through the web 13 and two screw openings 14, shows that the cylinder head gasket 10 is also permanently topographically shaped prior to assembly in the transverse direction. The surface line has a maximum 21 in the center between the screw openings 14 and minima in the vicinity of the screw openings 14. The thickness increases continuously towards the plate edges or rims 17. The otherwise continuous path of the surface deformation, once again, substantially corresponds to the corresponding bending line of the associated cylinder head and the deformations of the sealing surfaces of the engine block in the installed state.

Figure 4:
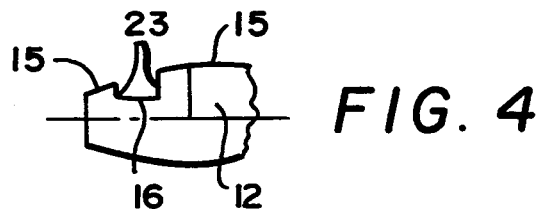
FIG. 4 is a vertical cross-section through the gasket according to FIG. 1 taken along the section line C—C.

By means of section line C—C, FIG. 4 shows that the non-bearing areas 16 are lowered from the otherwise continuous surface of the bearing areas 15, accompanied by the formation of steps 23.

Figure 5:
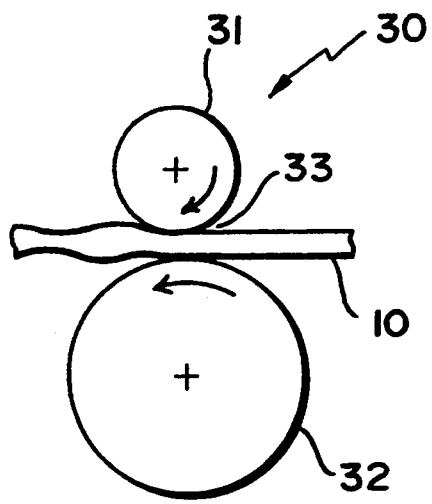
FIGS. 5-8 are side views of stamping means.

The above-described cylinder head gasket 10 is produced with the aid of a stamping device 30 shown in FIG. 5, which has a stamping roller 31 (stamping calendar), as well as a further stamping roller 32 arranged in axially parallel manner thereto. Between the two stamping rollers 31, 32, a drawing channel 33 is provided which is calibrated to the precise thickness of the cylinder head gasket 10.

On the circumferential surfaces of the two stamping rollers 31, 32 the topography of the top or bottom of the cylinder head gasket 10 is formed as a negative form, so that the corresponding surfaces are impressed or stamped in the gasket material on passing through the drawing channel 33. The stamping pressure is so high that the deformation forces are higher than the contact pressures occurring in the assembled state of the cylinder head gasket 10.

On passing through the drawing channel 33, due to the rolling pressure, a material flow occurs upstream of the drawing channel and following stamping there is no further influencing or deformation of the topography and in particular no material flow.

It can be advantageous for certain materials for the said stamping process to be performed in two steps. In a first step, a profile approximately the same as the final topography is stamped. Following this pre-impression, the final shaping occurs in a second step. The associated stamping roller pairs can be arranged in directly succeeding manner.

In the case of cylinder head gaskets which, along their axis, have portions with the same topography, such as, e.g., in FIG. 1, the longitudinal portions between two adjacent screw holes, the roller circumference corresponds to the length of such a portion. Thus, the associated topography of said portion is present on the circumferential surface. During every complete roller rotation a corresponding length portion of the cylinder head gasket is stamped and during each further revolution the topography is repeated.

If different length portions differ, e.g., in the manner of the bottom of the gasket in FIG. 2, the associated stamping roller 32 contains the complete topography of said gasket side. Therefore this side is stamped during a single, complete roller revolution.

Following the stamping process, all the combustion chamber passage openings 11, 12, screw holes 14 and further openings 20 are punched out. If micro-density characteristics are required, the gasket is subsequently coated with plastic or varnish in a surface after treatment in such a way that there is a peak-to-valley height compensation.

Figure 6:
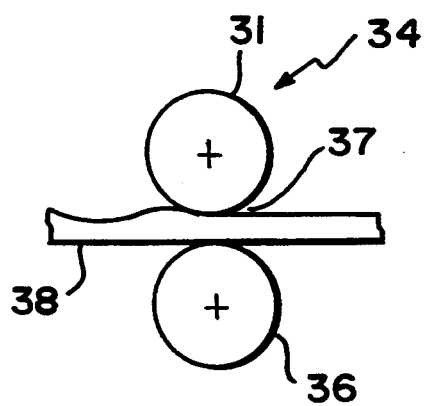

In the embodiment of a further stamping device 34 shown in FIG. 6, an unprofiled counterroller 36 faces a stamping roller 35, accompanied by the formation of a drawing channel 37. Thus, the production of the topography on a gasket 38 only takes place on one side.

Figure 7:
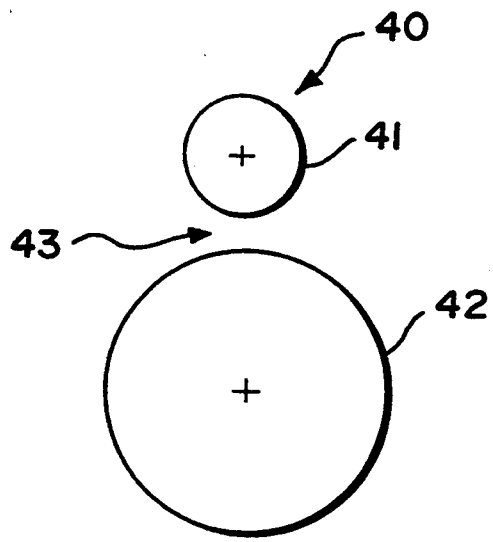

FIG. 7 illustrates an example of a third stamping device 40 with a first stamping roller 41, which faces a larger diameter, second stamping roller 42, accompanied by the formation of the drawing channel 43. On the first stamping roller 41 is shaped a periodically repeating area of a topography. For producing a cylinder head gasket for a four-cylinder engine, its circumference would correspond to a quarter of the gasket length. By revolving four times the topography portion obtained on the roller surface would correspondingly be impressed four times in periodic manner in the gasket material.

The second stamping roller has a circumference corresponding to the total length of the gasket to be produced, so that the stamping process takes place in a single revolution. The topography on the circumferential surface of the second stamping roller 42 contains a non-recurring stamping pattern. In the aforementioned example of a cylinder head gasket for a four-cylinder engine, the circumference of the second stamping roller 42 would correspond to four times the circumference of the first stamping roller 41, and e.g., the webs on the edges could be shaped differently from the inner webs. If they are to have a larger thickness, the second stamping roller 42 would have corresponding recesses.

Figure 8:
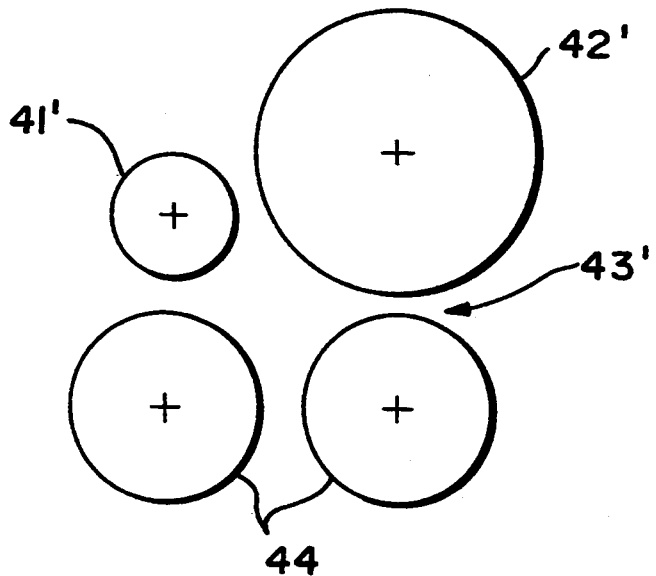

The embodiment of a fourth stamping device according to FIG. 8 differs from that of FIG. 7 in that the first and second stamping rollers 41',42' are arranged on the same side of the drawing channel 43', and that the two stamping rollers 41', 42' are associated with counterrollers 44. During the stamping process, a periodically recurring topography is produced, accompanied by the superimposing of a non-periodically recurring topography.

We claim:

1. Method of manufacture of a gasket comprising the steps of:
    A) determining contact pressures occurring between contact surfaces of components of a device to be sealed by the gasket to be manufactured and resulting deflections of said contact surfaces in a fitted state thereof, in which the components are assembled together with a gasket therebetween, and under operating conditions of the device of which the components to be sealed are part;
    B) selecting a sheet shaped sealing material which will be pressure-resistant and incompressible in said fitted state under said operating conditions of the device of which the components to be sealed are part;
    C) arranging at least one embossing roller with an associated counter cylinder in a manner forming a drawing channel therebetween, said at least one embossing roller being provided with a shaping surface which is a negative shape of at least a portion of a sealing face to be formed on the gasket to be manufactured from said sheet shaped sealing material in correspondence with the deflections of the contact surfaces determined during said determining step; and
    D) passing said sheet shaped sealing material through said drawing channel and permanently deforming the sheet shaped material with said shaping surface of the embossing roller in a manner forming said sealing face on an outer surface thereof;
    wherein said passing and deforming step is performed:
        (1) applying deforming forces to said sheet shaped sealing material, via said at least one embossing roller, which are higher than said contact pressures determined from said determining step;
        (2) producing a material flow of said sealing material solely in an upstream direction relative to passage of said sealing material through said drawing channel; and
        (3) without mechanically or thermally weakening said sealing material.

2. Method of manufacture according to claim 1, wherein said providing of said at least one embossing roller with a shaping surface comprises the data processing device controlled steps of:
    a) producing a fitting pattern by fixing a plasticly deformable material between the contact surfaces of the components to be sealed;
    b) removing the fitting pattern from between said contact surfaces and topographically scanning the fitting pattern with a thickness gage and storing data resulting therefrom in the data processing device; and
    c) modifying said stored data on the basis of the results of said determining step and producing said shaping surface of the embossing roller in accordance with said stored data as modified.

3. Method of manufacture according to claim 2, wherein the sealing face of said gasket is formed of a number of repeated identical configurational units; wherein said at least one embossing roller is a single embossing roller, the shaping surface of which is a negative of a single one of said configurational units; and wherein said sealing face is produced during said passing and deforming step using said single embossing roller and applying the shaping surface thereof to said sealing material for a number of consecutive revolutions of the embossing roller which is equal to said number of repeated identical configurational units.

4. Method of manufacture according to claim 1, wherein the sealing face of said gasket is formed of a number of repeated identical configurational units; wherein said at least one embossing roller is a single embossing roller, the shaping surface of which is a negative of a single one of said configurational units; and wherein said sealing face is produced during said passing and deforming step using said single embossing roller and applying the shaping surface thereof to said sealing material for a number of consecutive revolutions of the embossing roller which is equal to said number of repeated identical configurational units.

5. Method of manufacture according to claim 2, wherein said deforming step comprises a preembossing step in which said gasket is partially shaped, followed by an embossing step in which shaping of said gasket is completed.

6. Method of manufacture according to claim 5, wherein openings are cut in said gasket following said deforming step.

7. Method of manufacture according to claim 6, wherein said gasket is a cylinder head gasket for an engine and said openings are cut in correspondence with combustion chamber openings, fluid flow openings and screw openings in contact surfaces of a cylinder head and engine block of the engine.

8. Method of manufacture according to claim 2, wherein said gasket is a cylinder head gasket for an engine; and wherein openings are cut in the gasket, subsequent to said deforming step, in correspondence with combustion chamber openings, fluid flow openings and screw openings in contact surfaces of a cylinder head and engine block of the engine.

9. Method of manufacture according to claim 1, wherein said gasket is a cylinder head gasket for an engine; and wherein openings are cut in the gasket, subsequent to said deforming step, in correspondence with combustion chamber openings, fluid flow openings and screw openings in contact surfaces of a cylinder head and engine block of the engine.

* * * * *